(12) United States Patent
Steinborn

(10) Patent No.: US 6,485,258 B1
(45) Date of Patent: Nov. 26, 2002

(54) ELECTROMECHANICAL ACTUATOR FOR A VALVE AND STEAM TURBINE

(75) Inventor: Richard Steinborn, Leverkusen (DE)

(73) Assignee: Siemens Aktiengesellschaft, Munich (DE)

(*) Notice: Subject to any disclaimer, the term of this patent is extended or adjusted under 35 U.S.C. 154(b) by 0 days.

(21) Appl. No.: 09/646,948

(22) PCT Filed: Mar. 17, 1999

(86) PCT No.: PCT/DE99/00740

§ 371 (c)(1),
(2), (4) Date: Nov. 16, 2000

(87) PCT Pub. No.: WO99/49250

PCT Pub. Date: Sep. 30, 1999

(30) Foreign Application Priority Data

Mar. 23, 1998 (DE) .......................... 198 12 674

(51) Int. Cl.[7] .......................... F01B 25/02; F16K 31/12
(52) U.S. Cl. .......................... 415/151; 251/58
(58) Field of Search .................. 415/151, 156, 415/36; 251/58, 129.11

(56) References Cited

U.S. PATENT DOCUMENTS

| 363,643 | A | * | 5/1887 | Jacobs | 251/58 |
| 2,336,653 | A | * | 12/1943 | Taylor | 251/129.11 X |
| 3,270,728 | A | * | 9/1966 | Mizuno | 123/337 |
| 3,684,237 | A | * | 8/1972 | Hyde et al. | 251/58 X |
| 4,903,936 | A | * | 2/1990 | Kajiwara | 251/58 X |
| 5,333,989 | A | * | 8/1994 | Missana et al. | 415/151 X |

FOREIGN PATENT DOCUMENTS

| DE | 2742219 | * | 3/1979 |
| DE | 3236293 | * | 4/1984 |
| DE | 36 06722 A1 | | 9/1987 |
| DE | 37 06621 A1 | | 9/1987 |
| DE | 36 18479 A1 | | 12/1987 |
| DE | 4446605 A1 | | 6/1996 |
| EP | 0 040 732 A1 | | 12/1981 |
| WO | WO 98/13633 | | 4/1998 |

* cited by examiner

*Primary Examiner*—John E. Ryznic
(74) *Attorney, Agent, or Firm*—Staas & Halsey LLP

(57) ABSTRACT

The invention relates to an electromechanical actuating drive for a valve, in particular of a steam turbine. It has a push rod for setting an opening position of the valve and also an electric motor for driving the push rod. The push rod is connected to the electric motor via a transmission device which generates a changing torque, depending on the axial displacement of the push rod. The invention relates, furthermore, to a steam turbine.

34 Claims, 5 Drawing Sheets

ELECTROMECHANICAL ACTUATOR FOR A VALVE AND STEAM TURBINE

CROSS-REFERENCE TO RELATED APPLICATIONS

This application is based upon and claims priority to German Patent Application No. 198 12 674.3 filed Mar. 23, 1998 and International Application No. PCT/DE99/00740 filed Mar. 17, 1999, the contents of which are incorporated herein by reference.

BACKGROUND OF THE INVENTION

The invention relates to an electromechanical actuating drive for a valve, in particular of a turbine, with a push rod for setting an opening position of the valve and with an electric motor for driving the push rod. The invention relates, furthermore, to a steam turbine with a valve and with an associated actuating drive.

A turbine, in particular a steam turbine, usually has a considerable number of valves which may be used, for example, as fresh-steam, intercepting or bypass valves and also as scram valves. In such cases, the opening position of each of these valves serves for setting a respective material or steam stream and is capable of being set, for example, via a push rod assigned to the respective valve. Such a push rod is an integral part of an actuating drive assigned to the valve. In this context, the actuating drive may have to satisfy stringent requirements, particularly as regards actuating force and actuating speed. For the valve to have a high degree of reliability, it may be necessary, for example, that the actuating drive have an actuating force of about 200 kN and an actuating time of about 100 ms.

EP 0 040 732 A1 specifies an actuating drive for steam turbine valves which has a decentral hydraulic system. The hydraulic system of such an actuating drive is integrated to form a compact drive block arranged on the valve housing, so that only a cable system is still necessary for supplying energy to the actuating drive. If oil is used as hydraulic fluid, this may lead, under extremely unfavorable circumstances, to an ignition of the oil and therefore to a fire in the steam turbine.

DE 44 46 605 A1 specifies a valve for a steam turbine which has a valve spindle with a valve cone arranged thereon. The valve spindle is driven via an electric motor which is connected to the valve spindle via an electromagnetically actuated coupling. For automatic selfclosing of the valve, the latter comprises a cup spring system. The electromagnetic coupling is connected to a threaded bush which cooperates with the valve spindle guided fixedly in terms of rotation and which thus moves the latter axially. The threaded bush is designed as a spherical threaded bush, so that it acts upon the valve spindle with low play and low friction. Since the valve spindle is guided fixedly in terms of rotation, that is to say the latter can be moved up and down only axially when the threaded bush rotates, there is no need for a drive having a translational effect. Instead, an electric motor rotating in two different directions is sufficient for this purpose. However, the electric motor must have a torque safety device, in order thereby to prevent the situation where, for example during the closing of the valve, the valve cone adjoining the valve spindle at one end does not, when coming to bear against the sealing seat assigned to it, suffers damage or damages said sealing seat.

DE 36 18 479 A1 discloses a fitting for shutting off a flow, with a housing, in which a closing piece is movable between the open and shut end positions with the aid of a thread, with a rotary drive (drive motor) which is switched off with a time delay. A gear with two concentrically arranged ballscrew spindles is arranged between the rotary drive and the closing piece. A purely mechanical setting of a torque is achieved by means of this double-spindle system, the setting being carried out at a correspondingly high rotational speed without much effort.

SUMMARY OF THE INVENTION

An object on which the invention is based is, therefore, to specify an actuating drive for a valve, in particular of a turbine, in which, along with a particularly low risk of fire, fault-free operation of the valve is ensured. A further object of the invention is to specify a steam turbine with a low risk of operation being disrupted by a fire.

This and other objects are achieved by means of an electromechanical actuating drive with a push rod for setting an opening position of the valve, and with an electric motor for driving the push rod, the push rod and the electric motor being connected to one another via a transmission device, by means of which a changing torque can be generated, depending on the axial displacement of the push rod.

An electromechanical actuating drive with a transmission device, by means of which a changing torque can be generated, depending on the stroke of the push rod, is particularly advantageous in those valves in which the force to be exerted on the push rod during the closing or the opening of the valve changes as a function of the stroke of the push rod. This may occur in valves, for example in a steam turbine, in which a prevailing steam pressure is present on the valve cone and supports the latter during the closing operation or keeps the valve cone closed. In such a valve, initially a high force (steam pressure×effective valve cone surface) has to be overcome in order to open the valves to some extent. As soon as a particular opening cross section is afforded, pressure relief takes place, so that, during the further opening operation, in each case a lower force is necessary in order to displace the push rod. The transmission device may be designed appropriately, depending on the size, load and requirement of the valve, in particular the opening and closing operation (closing speed, etc.). Moreover, using an electric motor markedly reduces a risk of fire, as compared with actuating drives with oil hydraulics.

The electric motor is preferably designed as a variable-speed synchronous motor. A synchronous motor of this type makes it possible, particularly in conjunction with a power amplifier, to have highly accurate position regulation with a control accuracy of about 0.1 mm, along with a motor power up to about 30 kW. The power amplifier acts, in this case, as a frequency converter and allows a general or position-dependent reduction in the motor current and in the motor rotational speed. At the same time, all the drive powers and drive actuating speeds which are required in practice can be afforded by an appropriate adaption of the operating parameters.

In order to convert the rotational movement of the electric motor into a linear movement provided for driving the push rod, the transmission device is designed preferably as a crank mechanism, a planetary gear or the like.

Feed-dependent torque/force transmission is possible by means of a crank mechanism. Moreover, in the case of a quick closing of the valve, such as occurs, for example, during a quick-action closure of a valve in a turbine, necessary limit damping may already be achieved by means of the crank mechanism. Additional devices for speed reduction during the last stroke of the valve cone (sealing piece) into the valve seat may therefore be dispensed with, as required. In this case, a crank mechanism has a crank element, in particular a crank disk, which rotates about an axis of rotation and on which the push rod acts at a connection point, the connection point being at a distance from the axis of rotation of the crank element (crank disk). During a rotational movement of the crank disk, the push rod connected to it executes a linear movement along the main axis of the push rod between two maximum end positions. A very high torque can be generated in these end positions via the crank disk, since, during a rotation of the crank disk, only a very short linear distance is covered in the direction of the push axis in the respective end position.

The actuating drive is preferably designed in such a way that, when a closing position of the valve is reached, an angle in the range of between 5° and 20°, preferably about 10°, is formed between the main axis of the push rod and a connecting line between the connection point, at which the push rod acts on the crank disk, and the axis of rotation. Thus, when the valve is in the closing position, the connection point is located in the vicinity of a maximum end position, so that, during a rotation of the crank disk, a high torque and therefore a high force can be transmitted to the push rod. Thus, it becomes possible for the valve to be opened particularly easily by means of the actuating drive, without a particularly high-power and/or variable-torque electric motor having to be provided. The push rod is connected preferably to a connecting rod which acts at the connection point, in particular a crank pin connected fixedly to the crank disk. The connecting rod is connected rotationally movably to the push rod and to the crank pin in a plane in which the main axis of the push rod lies.

By means of the transmission device, in particular the crank mechanism, feed-dependent torque/force conversion can be implemented in a simple way, even in applications where a high feed force of, for example, approximately 200 kN is necessary in order to open a valve. By a variation in the crank radius (in the distance between the connection point and the axis of rotation) or by a displacement of the operating point, that is to say the position which the connection point assumes when the valve is in the closing position, the characteristic curve (torque characteristic curve) of the crank mechanism can be adapted to different requirements. For example, for a scram valve of a steam turbine, the choice of the geometry of the crank disk may be made with a view to providing a very high force for opening the valve and to the return force, acting in the event of a quick-action closure, of a storage spring assembly, in such a way that as high an acceleration force as possible is exerted on the crank mechanism.

An actuating drive with such a transmission device also affords the advantage that limit damping can be assumed even by the rotating crank disk. This is particularly important in the event of a quick-action closure, since, on the one hand, the valve must close with an average speed of, for example, 2 m/s and, on the other hand, the valve cone should come to rest on the valve seat only at a speed of, for example, 0.07 m/s. To be precise, without such limit damping, the valve cone would move, approximately unbacked, into the valve seat and could be damaged itself or could damage the valve seat.

As a result of a storage spring assembly (return spring system) which generates a uniform closing speed of the push rod in the event of a quick-action closure, there is a greater crank angle in the region of the end position, so that the crank disk is further accelerated in this region. The greater crank angle and the acceleration on the crank disk may therefore be utilized pre-eminently for limit damping in the region of the end position.

The actuating drive preferably has an electromagnetic denture clutch which ensures the transmission of force from the electric motor to the push rod, in particular to the transmission device. The electromagnetic clutch is preferably a positive clutch, in which two clutch parts engage positively one in the other and force and torque transmission thereby takes place without any appreciable contact pressure between these two clutch parts. By contrast, in a nonpositive clutch, the two clutch parts are pressed against one another with high pressure, so that force and torque transmission takes place for the substantial part as a result of this.

What is achieved by the electromagnetic clutch is that, in the event of a quick-action closure, the masses to be accelerated are extremely low and a minimal closing time is thereby achieved. Consequently, when the clutch is opened, there is a separation of the crank mechanism from the electric motor and from a rotary system assigned to the electric motor and comprising, for example, a gear and a drive shaft to the crank mechanism.

The electromagnetic clutch preferably has at least three coil systems (exciting coils) independent of one another, and, even if one coil system fails, it is ensured that the denture clutch is opened and also is kept closed. This system of coil systems operated independent of one another, in which the clutch continues to be operational if one coil system fails, is designated as the n–1 of n safety technique. Preferably, the clutch has three coil systems independent of one another and is therefore designed according to a 2-of-3 safety technique. In order to keep the clutch closed, the force of two coils is sufficient in this case. It is still possible to open the clutch even when one coil continues to draw the clutch together and the two remaining coils are switched for release of the clutch. The clutch preferably has a spacer element, in particular a spring, which, when the clutch is in the opened state, prevents the clutch parts from engaging one into the other. The coil systems have to act counter to this spacer element during the closing of the clutch. Preferably, at the same time, the clutch is designed in such a way that all three coil systems (all n coil systems) must function in order to close the clutch.

The denture clutch preferably has a clutch disk which is rotatable about a clutch axis and which can be brought along the clutch axis into engagement with a drive shaft connected to the electric motor. In this case, the clutch axis preferably coincides with the axis of rotation of the transmission device, that is to say of the crank mechanism. The clutch has, furthermore, a clutch hub, and, in one embodiment, the clutch hub is directly connected positively to the clutch disk and the clutch hub is spaced from the transmission device via the spacer means, in particular a spring. In another embodiment, the clutch disk is connected to the clutch hub via a spacer means, in particular a spring, and can be brought along the clutch axis into engagement with the clutch hub. In both instances, in each case only a low mass has to be moved during the opening and closing of the clutch, in order to achieve a separation of the electric motor from the transmission device.

The actuating drive preferably has a return spring system which is connected to the push rod and which exerts a force on the push rod in the direction of the closing position of the valve. Particularly in the event of a quick-action closure, closing of the valve is achieved via the return spring system by a corresponding force being exerted on the push rod.

Preferably, the denture clutch is mounted by means of a clutch bearing in such a way that at most a slight force has to be applied in order to disengage the denture clutch. Preferably, too, the clutch bearing at the same time comprises a ball joint. In a particularly preferred embodiment, the clutch disk is held by at least one holding rod mounted in the ball joint. By virtue of this embodiment of the denture clutch, the latter can be disengaged by means of even only a slight force. In particular, there is not catching of the denture clutch due to high static friction, which could prevent the denture clutch from being disengaged.

The object aimed at a steam turbine is achieved by means of a steam turbine such as has an actuating valve for setting a steam stream, in which case the actuating valve can be opened and closed via an actuating drive described in more detail above.

The advantages achieved by means of the invention are, in particular, that, by virtue of the electric motor provided for driving the push rod, it becomes possible for the actuating drive to be operated without pressure oil. Consequently, particularly in use in a steam turbine, the risk of fire is especially low. Moreover, the actuating drive can be installed in any desired installation position and, in particular, may be employed without high outlay as a replacement for an actuating drive with a decentral hydraulic supply. The electric motor can be adapted to different requirements in a particularly simple way by means of suitable activation, so that the actuating drive is especially flexible. The transmission device, in particular the crank mechanism, can likewise be adapted in a simple way to the different requirements. The components of the actuating drive, in particular the electric motor and the electromagnetic denture clutch, can be produced by simple means and are therefore particularly maintenance-friendly.

BRIEF DESCRIPTION OF THE DRAWINGS

The invention is described by means of an exemplary embodiment explained in more detail in the drawings. The drawing are partly diagrammatic, not true to scale and, for the sake of clarity and for understanding, cover only those components of an actuating drive and of a steam turbine which are important for the explanation. In the drawings.

DETAILED DESCRIPTION OF THE PREFERRED EMBODIMENTS

Figure 1:
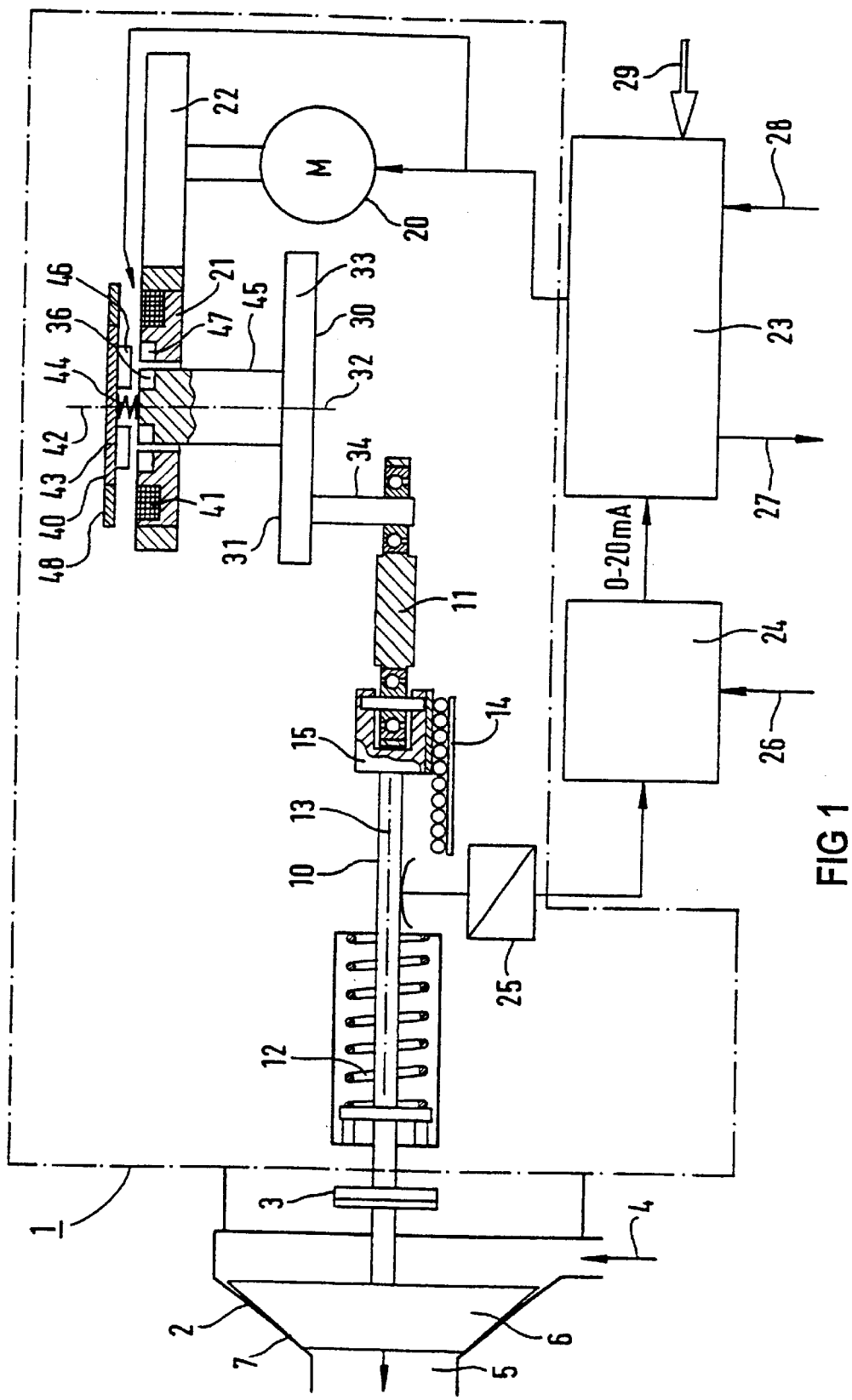
FIGS. 1 and 2 show a longitudinal section through an actuating drive, in each case illustrated diagrammatically, with a valve.

FIG. 1 illustrates a steam valve 2 in a closing position, with a steam inflow 4, with a steam outflow 5 and with a valve seat 7 arranged between them. A sealing piece 6, a valve cone 6, which closes the valve 2, comes to bear in the valve seat 7. The valve cone 6 has a valve connection piece 3, to which an actuating drive 1 is connected. The actuating drive 1 has a push rod 10 which extends along a main axis 13 and which is connected to a return spring system 12. The push rod 10 is connected, on the one hand, to the valve connection piece 3 and, on the other hand, positively to a crosshead 15. The crosshead 15 is in engagement with a linear guide 14, so that the push rod 10 can execute only a linear movement along its main axis 13. A connecting rod 11 is arranged on the crosshead 15 in such a way that said connecting rod is rotatable in a plane in which the main axis 13 of the push rod 10 lies. The connecting rod 11 is connected, likewise rotatably in this plane, to a crank pin 34 of a transmission device 30. The transmission device 30 has a crank mechanism 31, a crankshaft. The crankshaft 31 possesses a crank disk 33 which is rotatable about an axis of rotation 32 in the plane of the push rod 10. The crank pin 34 is connected positively to the crank disk 33 at a distance from the axis of rotation 32. Said crank pin therefore constitutes a connection point 34 between the crank disk 33 and the push rod 10. The crank disk 33 is connected fixedly and positively to a clutch hub 45 extending along the axis of rotation 32. A denture clutch 40 adjoins the transmission device 30 in the direction of the axis of rotation 32. The denture clutch 40 has a clutch disk 43 rotatable about the clutch axis 42 (the axis of rotation 32). The clutch disk 43 is connected to the clutch hub 45 via a spacer means 44, in particular a cup spring. The clutch hub 45 has a reaction gearwheel 36 in the circumferential direction at the end facing the clutch disk 43. This reaction gearwheel 36 is surrounded by a drive shaft 21 designed as a hollow shaft. Opposite the reaction gearwheel 36, the drive shaft 21 has an action gearwheel 47. In the direction of the axis of rotation 32, opposite the reaction gearwheel 36 and the action gearwheel 47, the clutch disk 43 has a clutch disk toothing 46. This clutch disk toothing 46 is designed to engage both into the action gearwheel 47 and into the reaction gearwheel 36. The drive shaft 21 has three coil systems 41 (exciting coils) which each consist of two exciting coils spaced apart from one another at an angle of 180°. In the direction of the axis of rotation 32, opposite the coil systems 41, the clutch disk 43 has a magnetic return 48, by means of which, when an electric current is applied to the coil systems 41, an axial displacement of the clutch disk 43 takes place counter to the return force of the spacer means 44, with an engagement of the clutch disk toothing 46 into the action gearwheel 47 and the reaction gearwheel 36. A multistep gear 22 connected to an electric motor 20 is connected to the drive shaft 21. The rotatable parts, in particular the drive shaft 21 and the clutch hub 45, are mounted preferably by means of sliding bearings.

The push rod 10 has engaging on it a measuring transducer 25 which serves for determining the position and speed of the push rod 10 or valve spindle. Measured values from the measuring transducer 25 can be supplied to an opening controller 24. Controller signals 26 can also be supplied to the opening controller 24. The opening controller 24 is connected to a power amplifier 23. The power amplifier 23 serves for activating the motor 20 and the coil systems 41. The power amplifier 23 is designed preferably as a frequency converter. It is supplied with electric current by means of a power supply 29 with battery backup. Signals for triggering a quick-action closure and in the event of load shedding can be supplied to said power amplifier via an input 28. Controller interference signals different from the power amplifier 23 can be picked off via an output 27.

Figure 2:
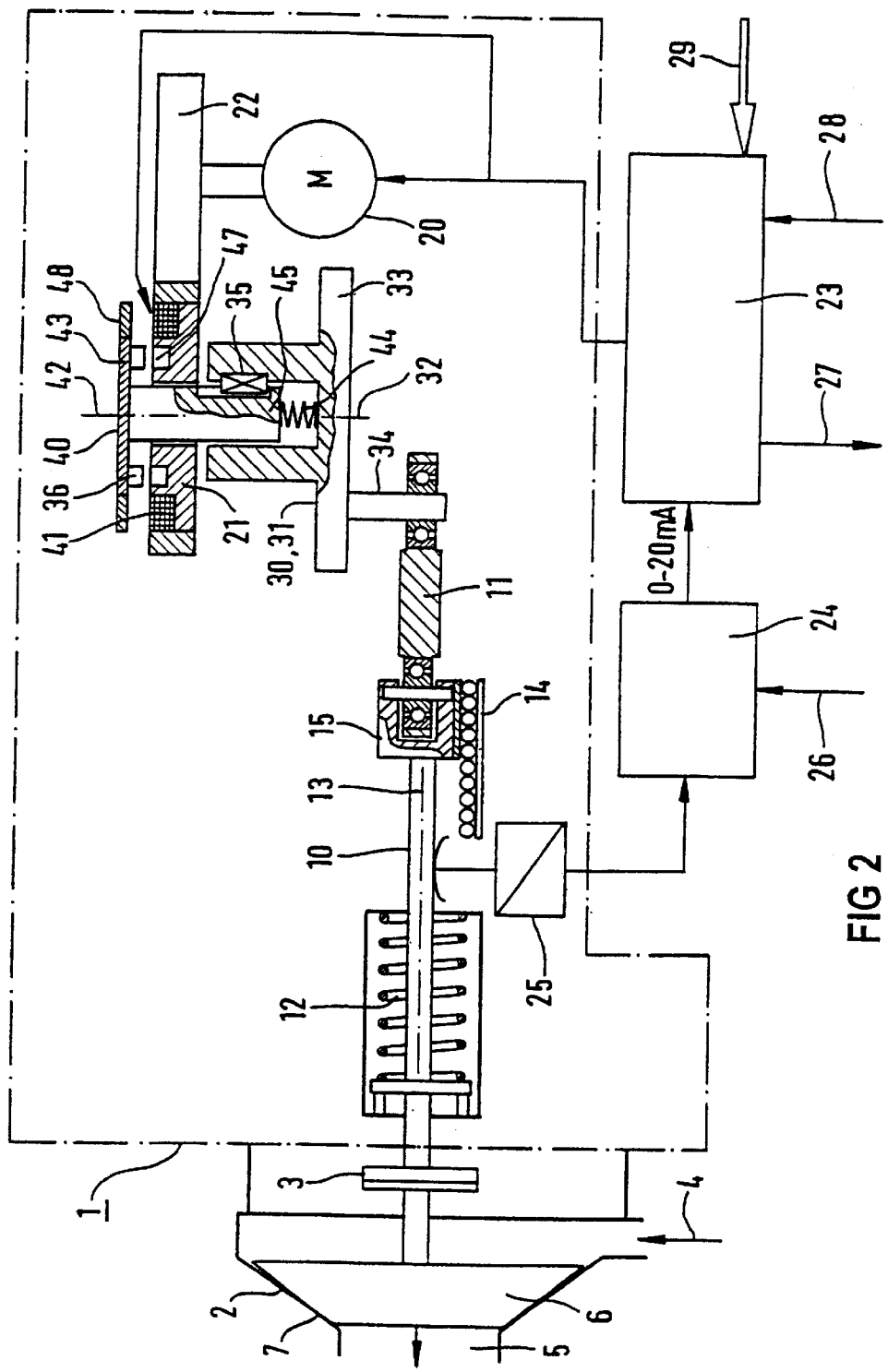

FIG. 2 likewise illustrates an actuating drive 1 similar to the actuating drive 1 according to FIG. 1. In the exemplary embodiment illustrated, these differ only in the embodiment of the clutch 40 and in the connection of the clutch 40 to the crank mechanism 31. As regards the description of the valve, push rod, electric motor and other elements of the actuating drive, reference may be made to the explanations relating to FIG. 1. According to FIG. 2, the clutch hub 45 is fixedly connected positively to the clutch disk 43. The clutch hub 45 is connected to the crank disk 33 via a spacer means 44, in particular a cup spring. The cup spring 44 is designed in such a way that it keeps the clutch 40 open, that is to say keeps the clutch disk 43 spaced axially from the drive shaft 21, so that the clutch 40 remains open. An axial serration 35 for engagement with the crank mechanism 31 is provided on the clutch hub 45. A rotational movement of the clutch disk 43 is thereby converted into a rotational movement of the crank disk 33. An action gearwheel 47 is once again provided, spaced axially from the clutch disk 43, in the drive shaft 21. Axially opposite this action gearwheel 47, the clutch disk 43 has a reaction gearwheel 36 which is designed to engage positively into the action gearwheel 47.

When the valve is activated in order to open it, the rotational movement of the shaft, not illustrated in any more detail, of the electric motor 20 is transmitted via a torque conversion of the multistep gear 23 to the hollow drive shaft 21. The latter is connected to the crank disk 33 via the electromagnetic clutch 40. The crank pin 34 is seated on the crank disk 33 so as to be offset (crank radius) from the axis of rotation 32. As a result of a rotation of the crank disk 33, a linear movement of the push rod 10 is generated via the connecting rod 11 by means of the crosshead 15 connected positively to the push rod 10. In this case, even when the valve 2 is in the closing position, the push rod 10 is loaded by the return force of the return spring system 12 which is designed as a valve storage cup spring assembly. During an opening movement of the actuating drive 1, the return spring system 12 is further tensioned and reaches its maximum return force when the valve 2 is in the open position.

For a quick-action closure of the valve 2, the coil systems 41 are switched to currentless (closed-circuit principle). A quick-action closure is initiated, for example, in the case of a turbine tripout, an auxiliary load shutdown, a load shutdown at the nominal rotational speed of the associated turbine and a failure of the power supply. By the coil systems 41 being shut down, the magnetic force of attraction between the coil system 41 and the clutch disk 43 lapses, with the result that the electromagnetic clutch 40 opens the spacer means 44 on account of the return force. Consequently, the drive shaft 21, together with the connected multistep gear 22 and the electric motor 20, is separated from the crank mechanism 31. The torque of the electric motor 20 is therefore no longer effective against the return force of the return spring system 12. The valve 2 thus assumes its closing position in a rapid actuating time of, for example, 100 ms.

In the exemplary embodiment described in FIG. 1, only the low mass of the clutch disk is moved axially in this case. In the embodiment according to FIG. 2 with a simple clutch toothing in which the action gearwheel 47 is arranged directly opposite the reaction gearwheel 36, the clutch hub 45 is additionally to be moved in the axial direction. In both design situations, the distance between the toothing of the clutch disk 46 or 36 and the toothing of the drive shaft (action gearwheel 47) is dimensioned in such a way that it becomes possible for them to rotate, unimpeded, relative to one another. The same applies to the radial spacing between the clutch hub 45 and the drive shaft 21 surrounding the latter. The clutch 40 is closed by the action of an electric current on the coil systems 41, with the result that a magnetic force of attraction is exerted by the coil systems 41 on the magnetic return 48 of the clutch disk 43 and the clutch 40 therefore engages into the drive shaft 21. When the clutch disk 43 engages into the drive shaft 21, the corresponding gearwheels 36, 46 and 47 are positively connected to one another according to the selected embodiment. Positive torque transmission thereby takes place between the corresponding gearwheels 36, 46 and 47. The tooth flanks are in this case preferably casehardened and ground. During a positive engagement of the respective gearwheels one into the other, in particular during a maximum opening of the valve 2, a surface pressure on the tooth flanks is obtained, thus giving rise to a static friction which counteracts an opening of the clutch 40, particularly when the clutch 40 is lubricated by means of oil. When there is lubricated static friction, with a coefficient of friction of about $\mu=0.1$ between the tooth flanks, the tooth flanks are beveled at an angle of about 11.5°, so that the frictional resistances can be overcome in a simple way.

Three coil systems 41 divided in two are preferably provided, each coil system 41 having two exciting coils arranged on the drive shaft 21 so as to be offset at 180°. The coil systems 41 are designed according to a two-of-three safety technique, thus ensuring that the electromagnetic force of two coils is sufficient to keep the clutch closed counter to the return force of the spacer means 44 (cup spring). All three coil systems 41 must be operational in order to close the clutch. In order to open the clutch 40, it is sufficient for two coil systems 41 to be operational, so that one coil system 41 may perfectly well still be in the conducting state and the clutch 40 is nevertheless opened. If the interruption of current to an exciting coil 41 fails, so that the latter carries current even in the event of a quick-action closure, the clutch 40 nevertheless opens. The availability and opening reliability of the clutch 40 are thereby increased.

Figure 3:
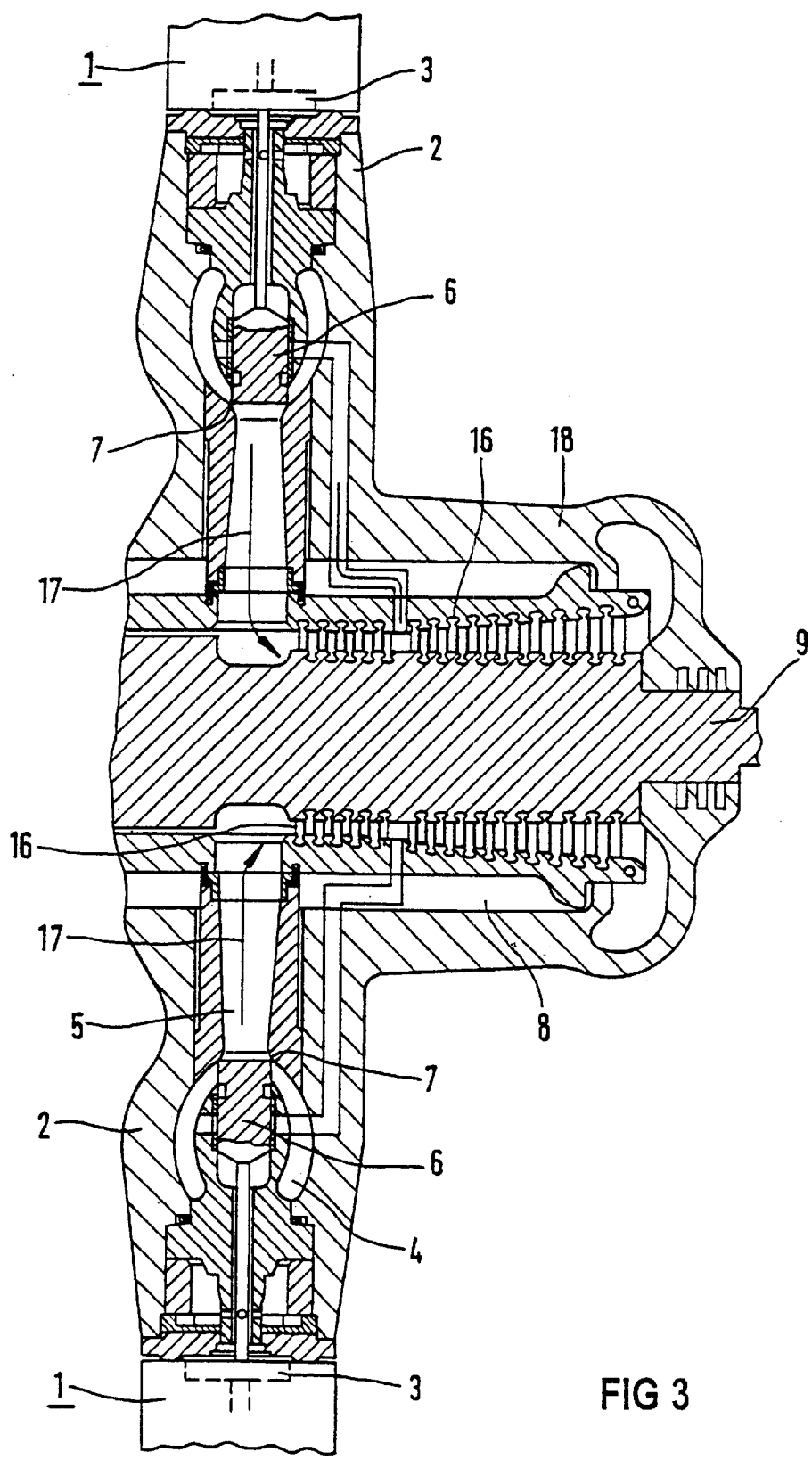
FIG. 3 shows a detail of a section through a high-pressure steam turbine with two regulating valves.

FIG. 3 illustrates a horizontal section through a high-pressure steam turbine 8. The steam turbine 8 has two actuating valves 2 arranged opposite one another. An actuating drive 1 is connected in each case to each actuating valve 2, as described in FIG. 1 or 2. The actuating valve 2 has a valve connection piece 3 for the actuating drive 1, a steam inflow 4, a steam outflow 5, a valve cone 6 and an associated valve seat 7. The steam turbine 8 has a turbine shaft 9 and a casing 18 surrounding the latter. The turbine blading 16 is arranged on the casing 18 and on the turbine shaft 9. While the steam turbine 8 is in operation, steam 17 passes through the actuating valves 2 into the steam turbine 8 and drives the turbine shaft 9 via the blading 16. The actuating valves 2 may be designed, in this case, as regulating valves and/or combined regulating and scram valves.

Figure 4:
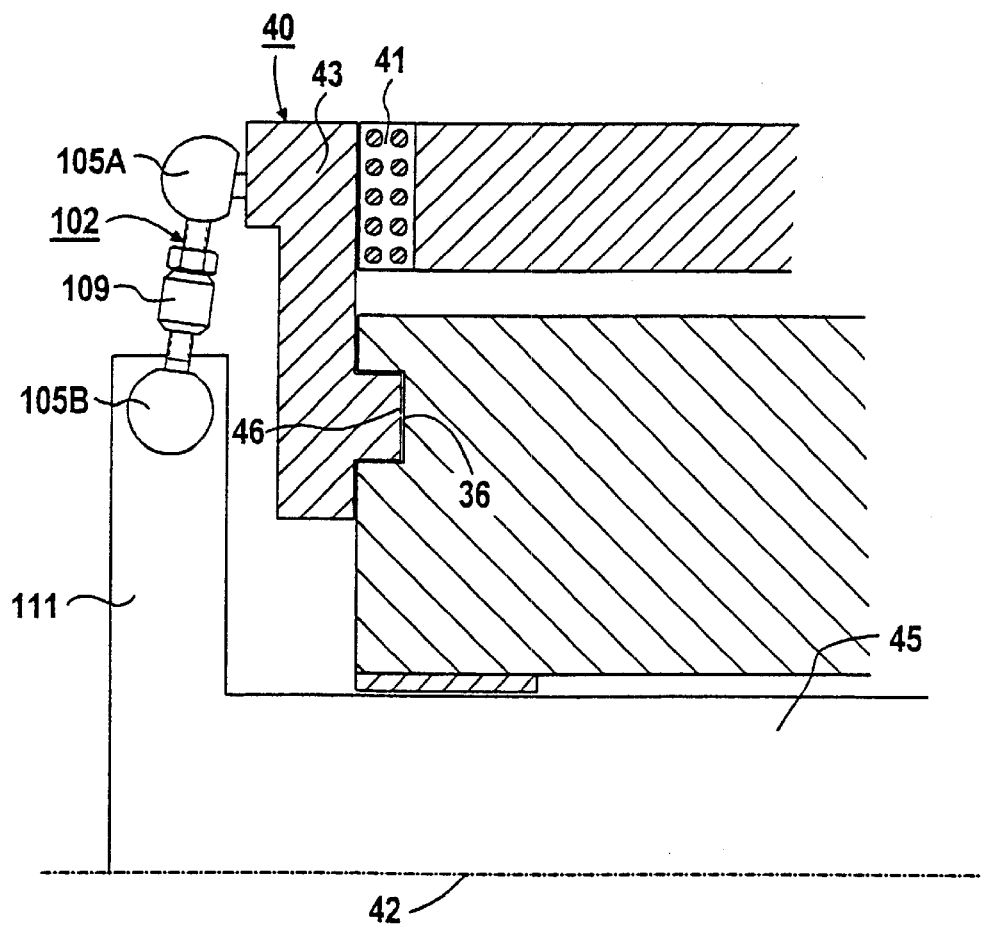
FIG. 4 shows a longitudinal section through a denture clutch.

FIG. 4 shows a longitudinal section through a further embodiment of the denture clutch 40. The clutch hub (45) is closed off by a disklike extension 111. This disklike extension 111 is connected to the clutch disk 43 by means of a holding rod 109. The holding rod 109 is connected to the disklike extension 111 in a first ball joint 105B. The holding rod 109 is connected at its other end to the clutch disk 43 by means of a second ball joint 105A. This embodiment makes it possible to dispense with the axial serration 35 of FIG. 2. Torque is transmitted to the transmission device 30 via the holding rods 109. Due to the mounting in ball joints, virtually no static friction occurs when there is axial movement along the clutch axis 42. The denture clutch 40 can therefore be disengaged even by means of a slight force. This prevents the disengagement of the denture clutch 40 from being blocked by high frictional forces. Operating reliability is further increased thereby.

Figure 5:
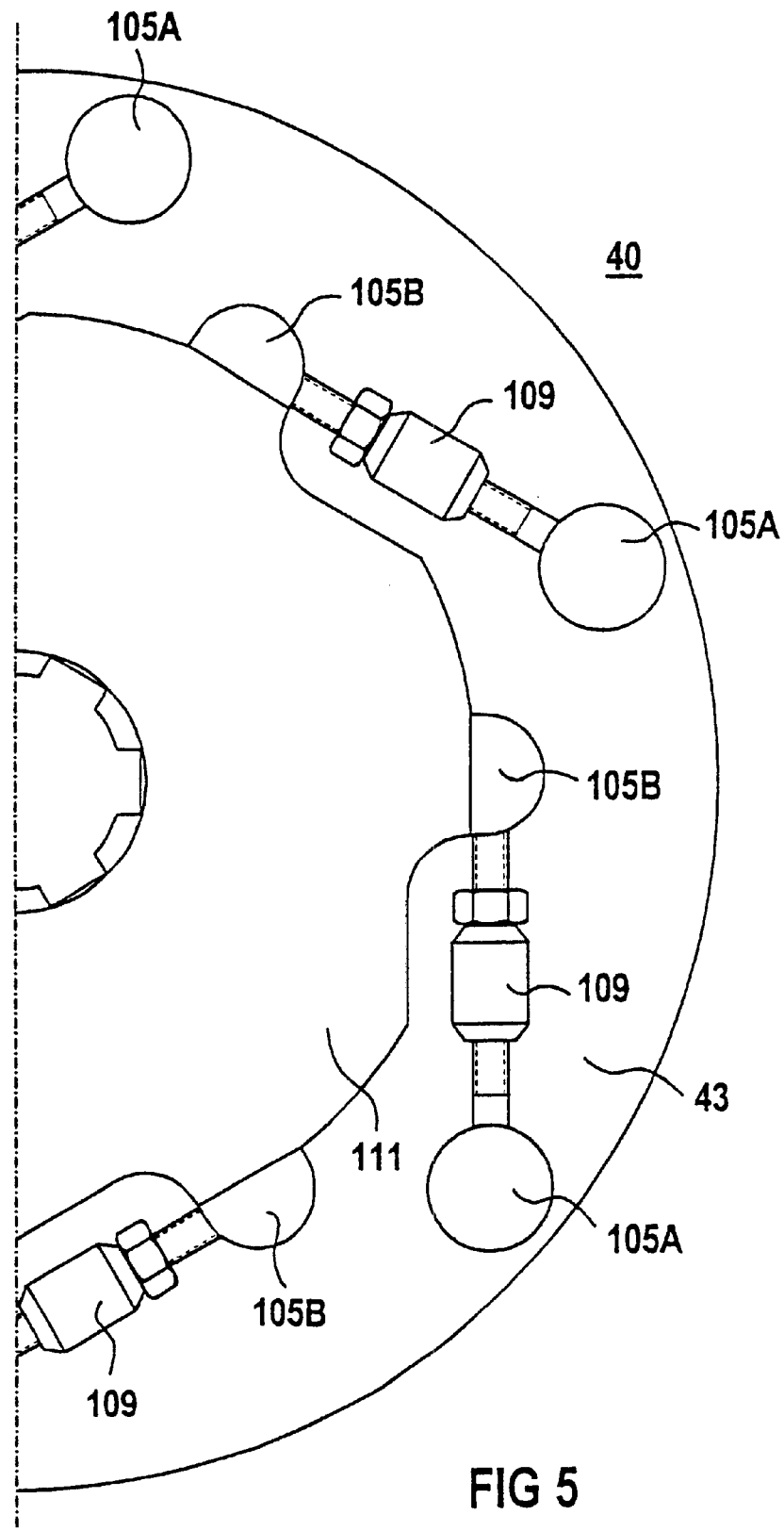
FIG. 5 shows a top view of the denture clutch 40 of FIG. 4.

FIG. 5 shows a top view of the denture clutch 40 of FIG. 4. The design of the disklike extension 111 in the manner of a sawblade can be seen. This ensures that the holding rods 109 remain freely movable during rotation.

The invention has been described in detail with particular reference to preferred embodiments thereof and examples, but it will be understood that variations and modifications can be effected within the spirit and scope of the invention.

What is claimed is:

1. An electromechanical actuating drive for a valve of a turbine, comprising:
    a push rod for setting an opening position of the valve; and
    an electric motor for driving the push rod, the push rod and the electric motor being connected via a transmission device to change torque generated, depending on the axial displacement of the push rod wherein an electromagnetic denture clutch is provided between the transmission device and the electric motor.

2. The electromechanical actuating drive as claimed in claim 1, wherein the transmission device has a planetary gear.

3. The electromechanical actuating drive as claimed in claim 1, wherein the transmission device has a crank mechanism.

4. The electromechanical actuating drive as claimed in claim 3, wherein the crank mechanism has a crank disk rotatable about an axis of rotation, the push rod engaging with the crank disk at a connection point spaced from the axis of rotation.

5. The electromechanical actuating drive as claimed in claim 4, wherein the push rod engages with the crank disk via a connecting rod.

6. The electromechanical actuating drive as claimed in claim 4, wherein, when a closing position of the valve is reached, starting from the axis of rotation, an angle in the range of between $5\pi$ and $20\pi$ is formed between the connection point and an axis of the push rod.

7. The electromechanical actuating drive as claimed in claim 4, wherein, when a closing position of the valve is reached, starting from the axis of rotation, an angle of approximately $10\pi$ is formed between the connection point and an axis of the push rod.

8. The electromechanical actuating drive as claimed in claim 1, wherein the electromagnetic denture clutch has at least three coil systems independent of one another, such that if one coil system fails, operation of the denture clutch is not effected.

9. The electromechanical actuating drive as claimed in claim 1, wherein the electromagnetic denture clutch has a clutch disk which is rotatable about a clutch axis and which can be brought along the clutch axis into engagement with a drive shaft connected to the electric motor.

10. The electromechanical actuating drive as claimed in claim 9, wherein the clutch disk is connected to a clutch hub by spacer means and can be moved along the clutch axis into engagement with the clutch hub.

11. The electromechanical actuating drive as claimed in claim 10, wherein the spacer means comprises a spring.

12. The electromechanical actuating drive as claimed in claim 9, wherein
    the clutch disk is connected to a clutch hub with a low contact pressure engagement, and
    the clutch hub is connected to the transmission device by spacer means.

13. The electromechanical actuating drive as claimed in claim 12, wherein the spacer means comprises a spring.

14. The electromechanical actuating drive as claimed in claim 1, wherein a return spring system is arranged on the push rod.

15. The electromechanical actuating drive as claimed in claim 1, wherein the denture clutch is mounted by a clutch bearing in such a way that at most a slight force has to be applied in order to disengage the denture clutch.

16. The electromechanical actuating drive as claimed in claim 15, wherein the clutch bearing comprises a ball joint.

17. The electromechanical actuating drive as claimed in claim 16, wherein the clutch disk is held by at least one holding rod mounted in the ball joint.

18. A steam turbine comprising:
    a valve seat;
    a sealing piece movable with respect to the valve seat to control a stream of steam; and
    an electromechanical actuating drive to actuate the sealing piece with respect to the valve seat, the electromechanical actuating drive comprising:
        a push rod for setting an opening position of the sealing piece; and
        an electric motor for driving the push rod, the push rod and the electric motor being connected via a transmission device to change torque generated, depending on the axial displacement of the push rod wherein an electromagnetic denture clutch is provided between the transmission device and the electric motor.

19. The steam turbine as claimed in claim 18, wherein the electromagnetic denture clutch has at least three systems independent of one another, such that if one coil system fails, operation of the denture clutch is not effected.

20. The steam turbine as claimed in claim 18, wherein the electromagnetic denture clutch has a clutch disk which is rotatable about a clutch axis and which can be brought along the clutch axis into engagement with a drive shaft connected to the electric motor.

21. The steam turbine as claimed in claim 20, wherein the clutch disk is connected to a clutch hub by spacer means and can be moved along the clutch axis into engagement with the clutch hub.

22. The steam turbine as claimed in claim 21, wherein the spacer means comprises a spring.

23. The steam turbine drive as claimed in claim 20, wherein
    the clutch disk is connected to a clutch hub with a low contact pressure engagement, and
    the clutch hub is connected to the transmission device by spacer means.

24. The steam turbine as claimed in claim 23, wherein the spacer means comprises a spring.

25. The steam turbine as claimed in claim 18, wherein a return spring system is arranged on the push rod.

26. The steam turbine as claimed in claim 18, wherein the denture clutch is mounted by a clutch bearing in such a way that at most a slight force has to be applied in order to disengage the denture clutch.

27. The steam turbine as claimed in claim 26, wherein the clutch bearing comprises a ball joint.

28. The steam turbine as claimed in claim 27, wherein the clutch disk is held by at least one holding rod mounted in the ball joint.

29. A steam turbine comprising:
    a valve seat;
    a sealing piece movable with respect to the valve seat to control a stream of steam; and
    an electromechanical actuating drive to actuate the sealing piece with respect to the valve seat, the electromechanical actuating drive comprising:
        a push rod for setting an opening position of the sealing piece; and an electric motor for driving the push rod, the push rod and the electric motor being connected via a transmission device to change torque generated, depending on the axial displacement of the push rod, wherein the transmission device has a planetary gear.

30. A steam turbine comprising:

a valve seat;

a sealing piece movable with respect to the valve seat to control a stream of steam; and an electromechanical actuating drive to actuate the sealing piece with respect to the valve seat, the electromechanical actuating drive comprising:

a push rod for setting an opening position of the sealing piece; and an electric motor for driving the push rod, the push rod and the electric motor being connected via a transmission device to change torque generated, depending on the axial displacement of the push rod, wherein the transmission device has a crank mechanism.

31. The steam turbine as claimed in claim 30, wherein the crank mechanism has a crank disk rotatable about an axis of rotation, the push rod engaging with the crank disk at a connection point spaced from the axis of rotation.

32. The steam turbine as claimed in claim 31, wherein the push rod engages with the crank disk via a connecting rod.

33. The steam turbine as claimed in claim 31, wherein, when a closing position of the valve seat is reached, starting from the axis of rotation, an angle in the range of between $5\pi$ and $20\pi$ is formed between the connection point and the main axis.

34. The steam turbine as claimed in claim 31, wherein, when a closing position of the valve seat is reached, starting from the axis of rotation, an angle of approximately $10\pi$ is formed between the connection point and the main axis.

* * * * *